United States Patent [19]

Sasso et al.

[11] Patent Number: 5,135,559
[45] Date of Patent: Aug. 4, 1992

[54] APPARATUS FOR FORMING ARTICLES OF HOLLOW GLASS COMPRISING AN IMPROVED DISTRIBUTION OF THE GOBS OF MOLTEN GLASS

[75] Inventors: Danielle Sasso; Claudio Bellina, both of Vicenza, Italy

[73] Assignee: BDF-Boscato & Della Fontana S.p.A., Vicenza, Italy

[21] Appl. No.: 627,264

[22] Filed: Dec. 14, 1990

[30] Foreign Application Priority Data

Dec. 15, 1989 [IT] Italy ................. 85694 A/89

[51] Int. Cl.⁵ ........................................... C03B 7/16
[52] U.S. Cl. ........................................ 65/158; 65/164; 65/304; 65/DIG. 13; 65/225
[58] Field of Search ................. 65/164, DIG. 13, 158, 65/304, 225, 222, 304, 122, 221, 207

[56] References Cited

U.S. PATENT DOCUMENTS

| | | | |
|---|---|---|---|
| 3,846,107 | 11/1974 | Foster et al. | 65/207 |
| 4,357,157 | 11/1982 | Cardenas-Franco | 65/164 |
| 4,529,431 | 7/1985 | Munford | 65/225 |
| 4,608,074 | 8/1986 | Knoth | 65/164 |
| 4,687,502 | 8/1987 | Douglas | 65/164 |
| 4,740,227 | 4/1988 | Bratton | 65/164 |
| 4,988,273 | 1/1991 | Faig et al. | 425/145 |

*Primary Examiner*—Richard V. Fisher
*Assistant Examiner*—John Hoffmann
*Attorney, Agent, or Firm*—Bucknam and Archer

[57] ABSTRACT

The improved distributor for gobs of molten glass is self-actuated by means of a brushless motor having continuous current with microprocessor logic. The distributor permits to modify electronically the schedule of delivery and carry out small corrections of the angles of delivery. The motor is connected to the scoops via a toothed belt and a rack and pinion device.

5 Claims, 4 Drawing Sheets

APPARATUS FOR FORMING ARTICLES OF HOLLOW GLASS COMPRISING AN IMPROVED DISTRIBUTION OF THE GOBS OF MOLTEN GLASS

The present invention relates to apparatuses intended to collect gobs and more specifically has the object of providing a gob distributor of the rotating type with control by means of a self-controlled motor, the apparatus being capable of distributing the gobs of molten glass to different sections of the machine which forms articles made of hollow glass with a mechanical distribution by means of one or more distributing scoops.

The present invention provides an apparatus which is an improvement over the previous patents issued to the same assignee, Italian No. 905,825 and Italian No. 1,046,540.

The earlier patent describes a rotating apparatus intended to collect gobs, with a control by means of a cam. The apparatus is capable of distributing the gobs of molten glass to the different sections of the machine forming the articles of glass by means of a single oscillating scoop, the scoop being capable of a rotating motion around an axis.

The second patent describes a double cam connected with a pair of bell crank levers which control a toothed staff. The toothed staff provides for imparting a rotating motion to the pins which carry the scoops intended to collect the gobs so that in this manner the scoops may be brought into the desired positions for the purpose of distributing the gobs of molten glass to the individual sections of the machines which form the articles.

It is well known that an apparatus capable of forming objects made of hollow glass comprises in general one or more equal forming sections arranged side by side, each section receiving separately and at regular intervals a load of molten glass coming from the feeding device and being capable of forming the gobs in a reproducible manner. The gobs are deviated successively to the different forming sections of the machine by means of the mechanism of a gob distributor which comprises between one and four distributing scoops depending on the procedure being used, the scoops having the function of distributing the gobs being fed to each particular section involved in the delivery. In view of the fact that the machine is constituted by several forming sections, the gobs must be distributed in a sequence to the different sections with an exact order of delivery which is determined by the number of the sections, the fact that the delivery of the machine occurs with a rotation both in the right direction as well as in the left direction and also the fact that it depends on the different spacing which one must obtain between the finished objects after the latter are brought on to the conveyer belt which is disposed on the front part of the machine.

According to the form commonly used for this type of mechanism, there has been provided a complex of distributing scoops capable of a rotating, oscillating motion around an axis actuated by a control with a mechanical cam which permits to achieve the desired positioning.

In actual practice, these devices which serve as gob distributors based on a mechanical cam for actuation are limited by the maximum speed which may be achieved and by the low inherent flexibility.

With the increasing number of the sections present in the forming apparatuses which occasionally goes as far as twelve, and in view of the greater production rates achieved today in the forming processes, it has been noted that the dynamic limit of the gob distributor having cams for the mechanical control is 160 deliveries per minute, a number which is insufficient to satisfy the 200-240 deliveries per minute required today in the apparatuses with high productivity.

The dependence of the motion of the scoop to a system which utilizes one or more cams connected to a plurality of stations having styluses with rollers causes inconveniences due to the inertia of the parts of the apparatuses in reciprocating motion which may determine the separation of the roller from the cam track and the subsequent return to it with the rise of damaging impacts both to the mechanism as well as to the accuracy required by the delivery.

There is also the necessity of causing the production of the apparatuses more flexible with the possibility of decreasing the number of operative sections which function contemporaneously. This makes it necessary to achieve a more rapid and simpler system of reprogramming the schedule of delivery of the gob distributor, a fact which requires with a mechanism with mechanical cams, the substitution of the cams on the distributors.

The object of the present invention is to eliminate the device of mechanical position by means of rotating cams by substituting a self-controlled motor which has the function of serving as a positioner. The device according to the present invention comprises a positioning head which carries the shafts which carry the scoops and a mechanical transmission which permits to obtain a rotation of 90° of the mechanism and the placing out of service in the rest position.

The mechanical part of the device comprises a double transmission having a toothed belt and a rack, preferably with inclined teeth; the entire assembly being actuated by a motor having a continuous current without brushes, of the type usually called brushless.

With a device of this type, it is possible to increase the frequency of operation up to 240 deliveries per minute which is the requirement of the apparatuses having high productivity. The device according to the present invention is capable of being applied to automatic apparatuses for the formation of objects made of hollow glass having individual sections, usually called IS machines because the management of the motions of the mechanism is accomplished by means of a computer or a portable terminal.

The data which may be programmed in the keyboard are the number of available sections in the apparatus, the number of operative sections, the order of delivery, the angle of the delivery for each section, the phase displacements capable of synchronizing the gob distributor with the feeding mechanism.

The control system according to the present invention permits in addition the automatic recording of the angles of delivery of the various sections which after they are entered in the memory are utilized during the automatic operation of the machine. A continuous control of the positioning error is achieved by the device by means of a position sensor mounted on the control shaft of the rack.

The invention is illustrated in the accompanying drawings of which:

Figure 1:
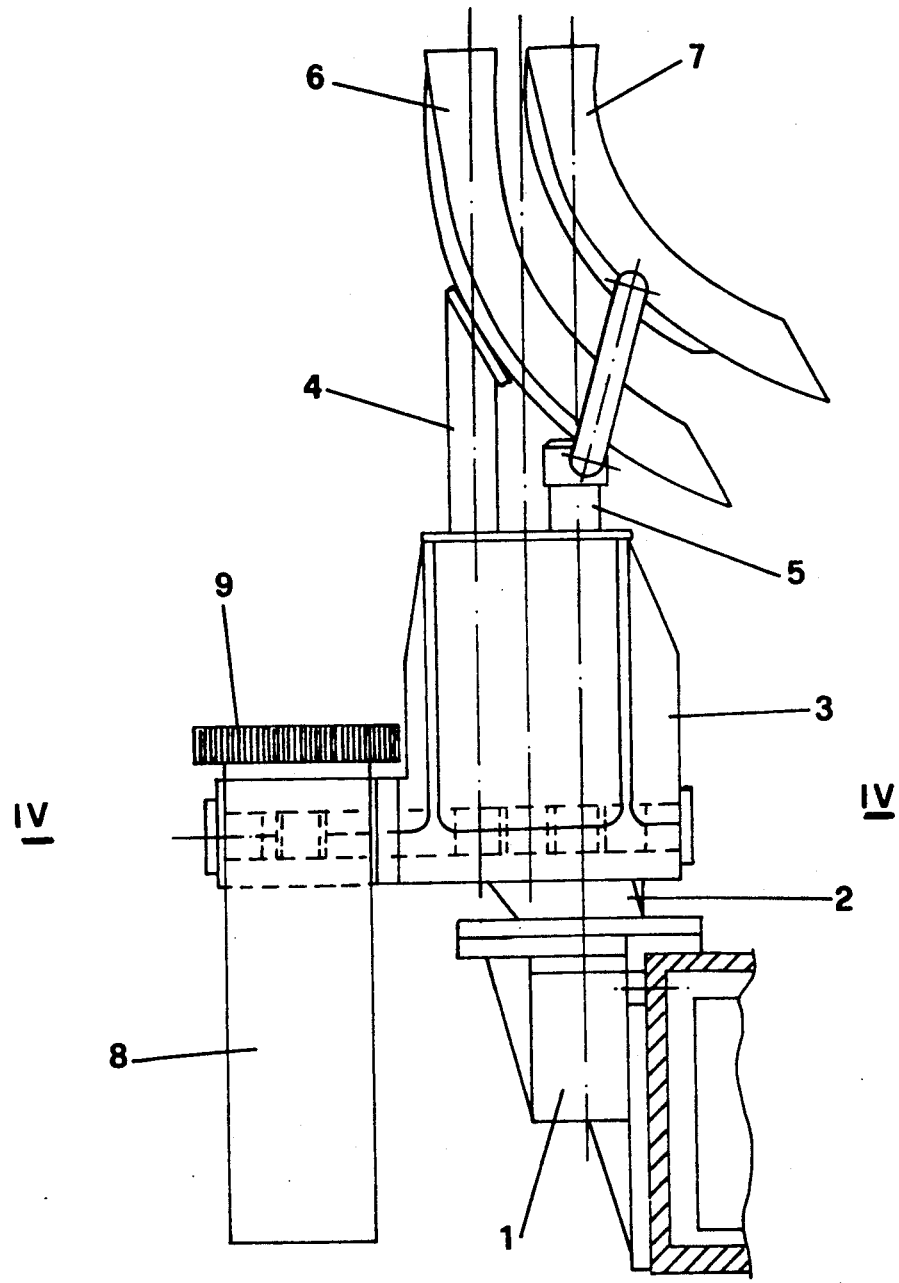
FIG. 1 is a side elevational view of the device of the present invention.
Figure 2:
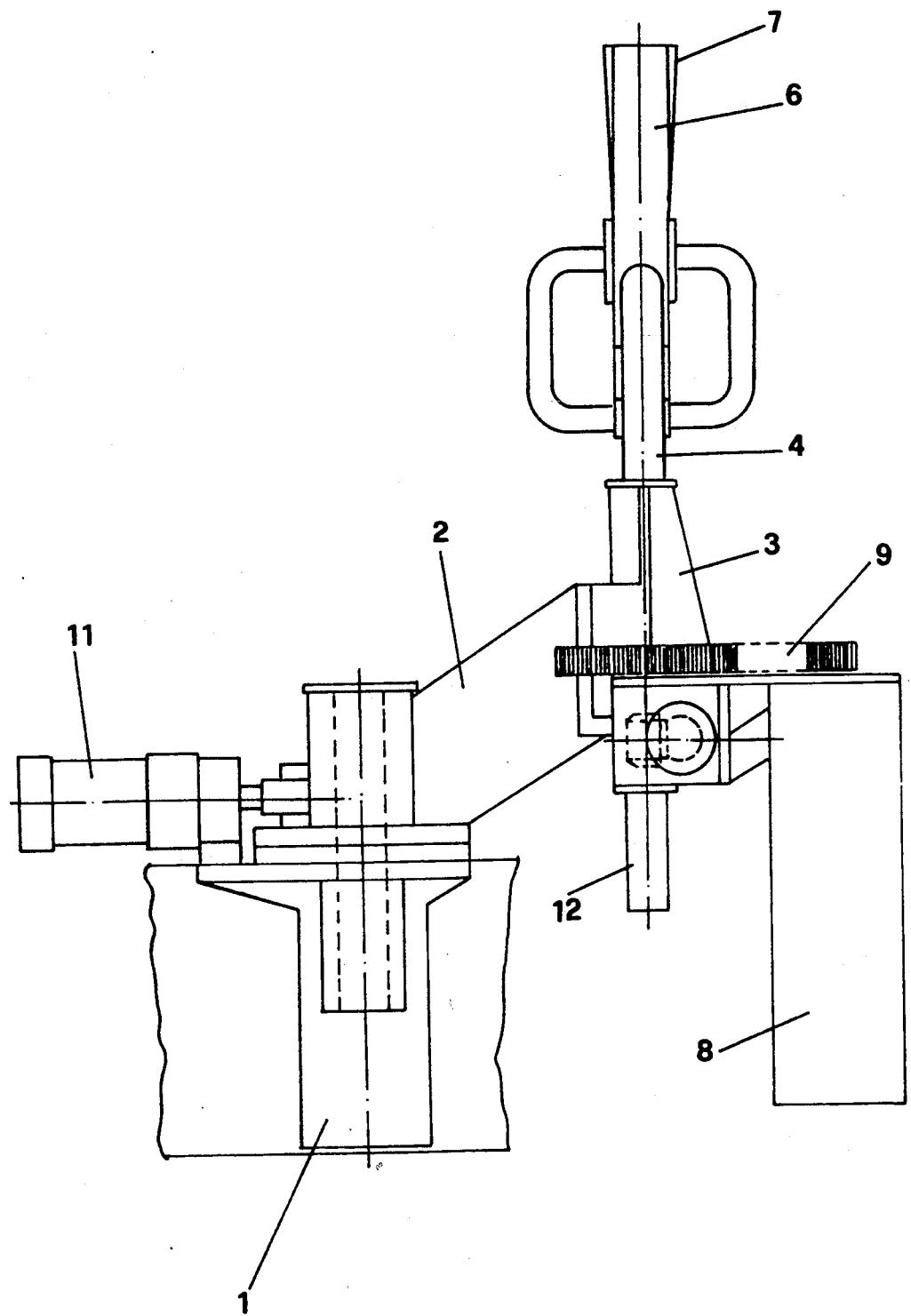
FIG. 2 is a rear view of the device.

As shown in FIG. 1, the device comprises a support 1 to which is connected the rotating arm 2 which carries the complex 3 on which are mounted the shafts 4 and 5; the latter carrying the distributing scoops respectively 6 and 7 in an arrangement like a chandelier.

The distributing scoops have the shape of ducts being capable of distributing the gobs of molten glass to the various molds, the latter being arranged in the form of a dial around a distributor. The motion of rotation of the shafts 4 and 5 is controlled by the self-controlled motor 8 preferably of the type normally called brushless. The motor controls by transmission by means of the toothed belt 9, the linear motion of the rack 10 which applies a rotation to shafts 4 and 5 which support the scoops which distribute the gobs of molten glass. The scoops may be in the number of 2, 3 or even more depending upon the particular requirements of the apparatus.

Figure 3:
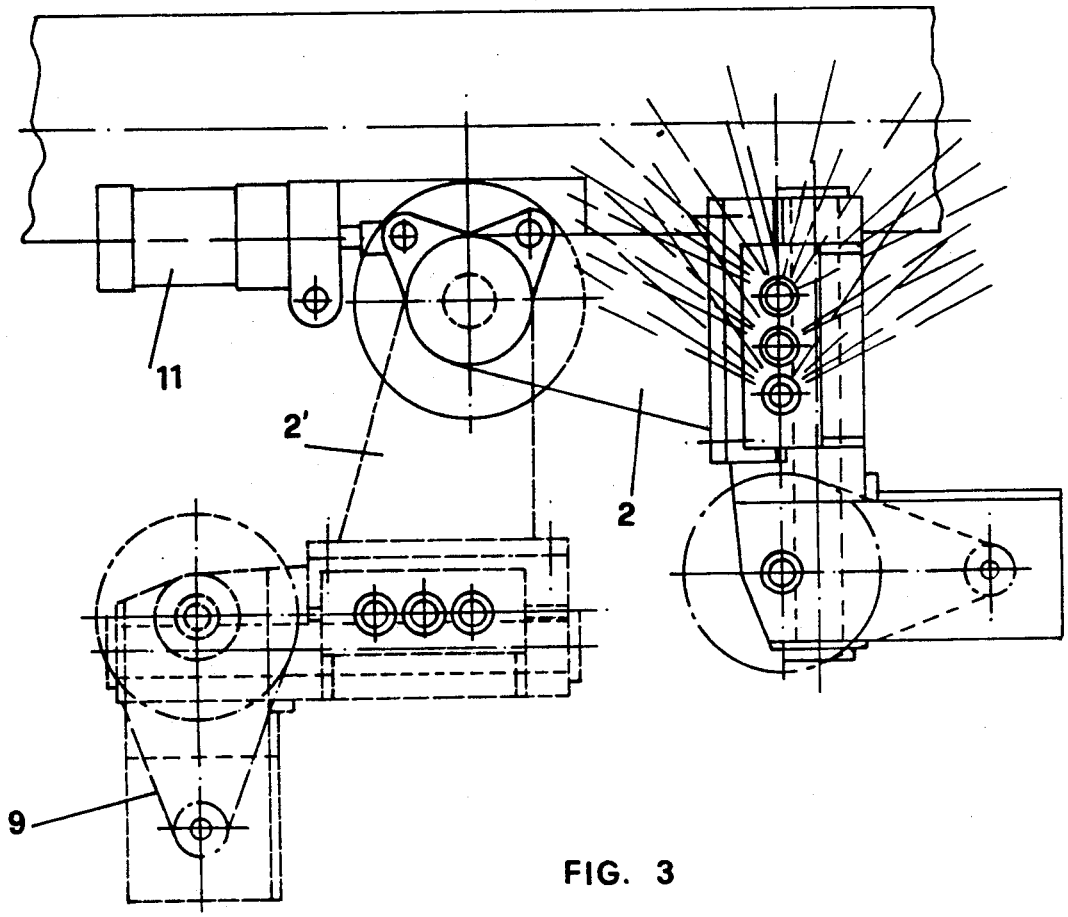
FIG. 3 is a plan view of the device of the present invention in two positions during operation and in the rest position respectively.
Figure 4:
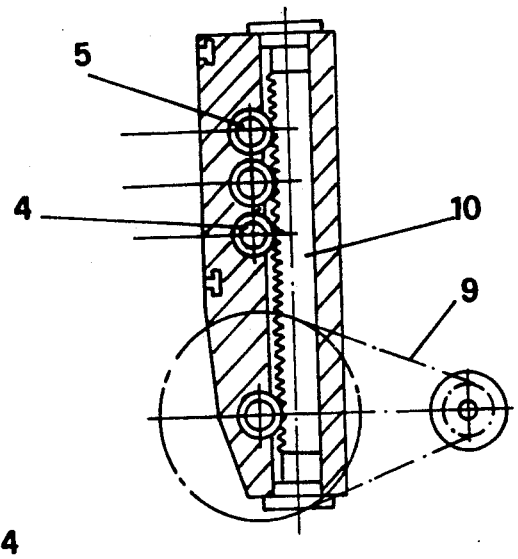
FIG. 4 is a longitudinal cross-section according to line IV—IV of FIG. 1.

As shown in FIG. 3, the rotation of the arm 2 to the position 2' controlled by the pneumatic cylinder 11 permits to bring the scoops in the rest position where operation of cleaning and maintenance of the apparatus may be carried out. The sequence of the positioning of the scoops 6 and 7 is achieved as already mentioned hereinabove by means of a motor having continuous current of the brushless type controlled by a controlled action with a microprocessor technique.

Figure 5:
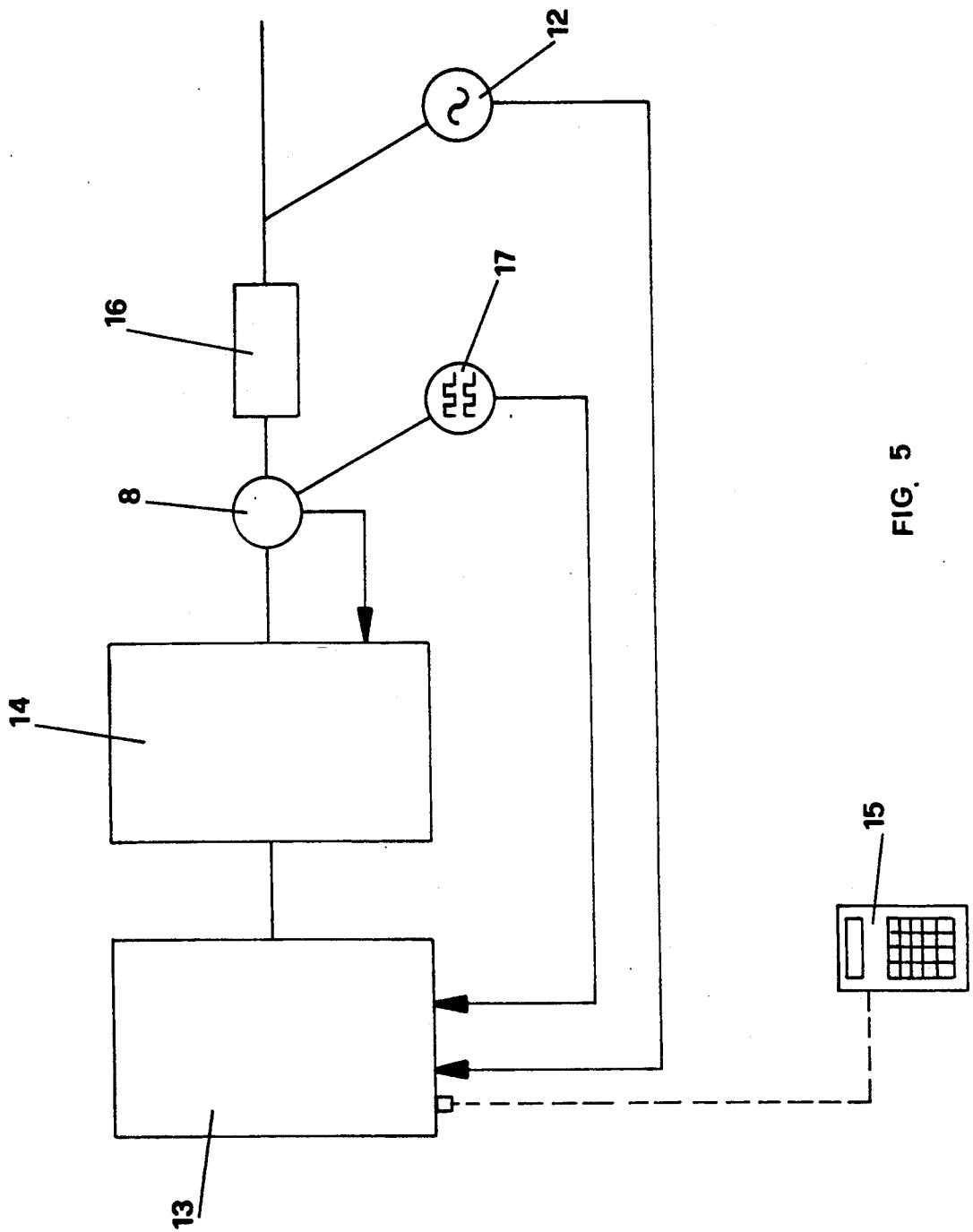
FIG. 5 illustrates the electronic regulation scheme of the device.

The exact positioning during the desired order of delivery is controlled by a schedule of regulation 13 as shown in FIG. 5 which by means of the position sensor 12 mounted on the exit shaft of the pulley controls the control device 14 based on a microprocessor which controls in turn the motor 8 provided with a reduction gear 16 while the coder 17 connects the motor 8 to the regulation schedule 13. By controlling the angular position of the shaft, the angular position of the scoops 6 and 7 is noted.

With the distribution system illustrated hereinabove, there is obtained an alternative motion of parallel articulation of the scoops which is very accurate, the motion being strictly connected to the complex of the equipment of the delivery of the drops to the dies of the machine.

Further, it is possible to correct the angles of delivery which have been noted and memorized in the automatic recording part of the apparatus by means of a portable terminal (15) which has a keyboard of a known type so as to allow the maximum accuracy of operation.

The portable terminal 15 is also utilized for programming of all the data required for the correct functioning of the device so as to allow maximum accuracy of operation.

Obviously the structural details of the apparatus described hereinabove and illustrated in the drawings have been given merely by way of example and they are not intended to limit the invention because different forms and different aspects are permissible while retaining the essential features of the invention.

What is claimed is:

1. In an apparatus for forming a hollow article of glass, which comprises equal forming sections arranged side by side and having molds and a distributing device for distributing molten glass to each section separately and at regular intervals, said distributing device comprising at least two scoops for distributing the gobs of molten glass from a gob feeder disposed above said sections to said molds, the improvement which comprises a distributing device comprising a support (1), a rotating arm (2) connected to said support, shafts (4 and 5) mounted on said rotating arm (2), said shafts having toothed wheels integral thereto, scoops (6 and 7) supported by said shafts, and a brushless motor (8) having continuous current and controlled with a microprocessor, said motor having a pulley and imparting a motion of rotation to said shafts by the interposition of mechanical transmission means, said mechanical transmission means consisting of a toothed belt (9) connected with said pulley of said motor, a pinion and a rack (10), said rack engaging said toothed wheels of said shafts.

2. The apparatus according to claim 1, wherein said mechanical transmission means further comprises an angular positioning sensor, wherein said positioning sensor is connected to the microprocessor, for the purpose of correcting errors in the operative positions of said scoops.

3. The apparatus according to claim 1 which comprises a pneumatic cylinder (11) capable of rotating said arm, said motor and said scoops from an operative position to the rest position, said rest position being suitable for the operation of cleaning and maintenance.

4. The apparatus according to claim 2, wherein the brushless motor is controlled by a regulation schedule which permits automatic recordal of delivery positions through said positioning sensor and the apparatus further comprises a portable terminal.

5. The apparatus according to claim 1 wherein said rack has inclined teeth.

* * * * *